Jan. 27, 1925.　　　　　　　　　　　　　　　　　1,524,135
D. JORDAN
SCRAPER
Filed May 10, 1924　　　　　　2 Sheets-Sheet 2
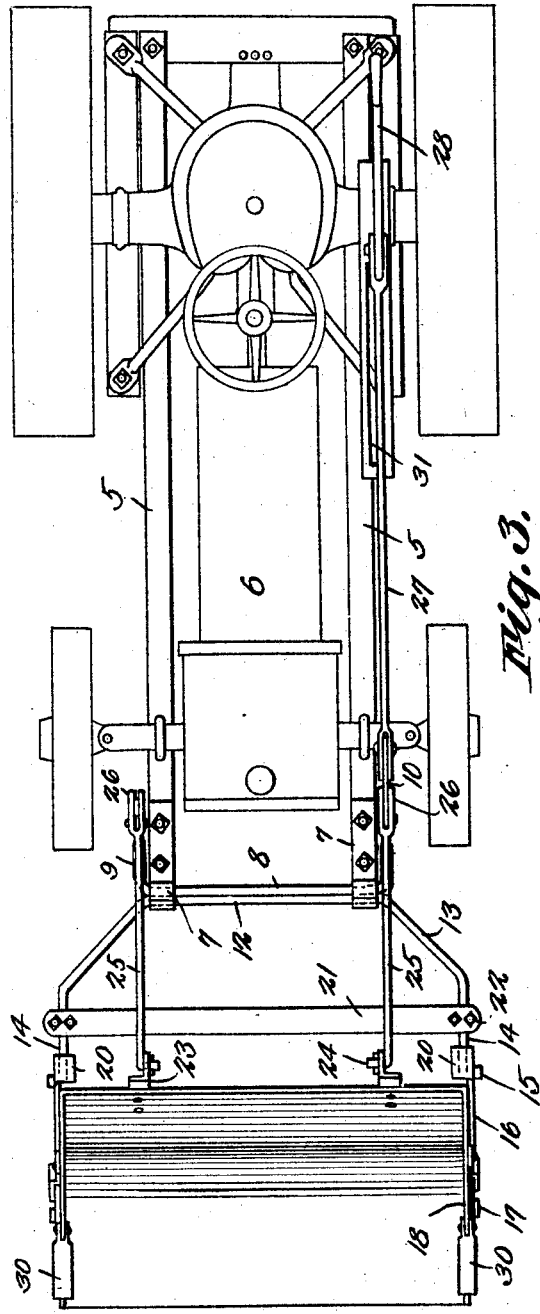
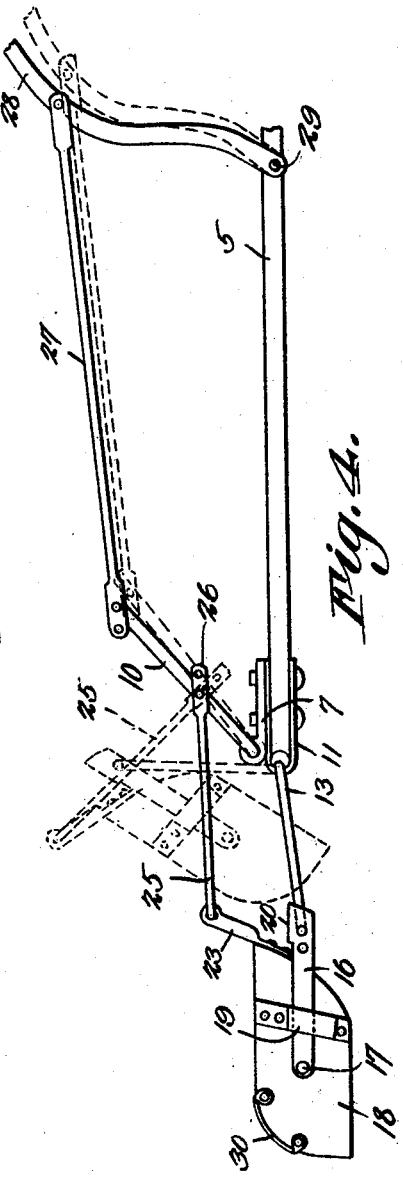
Inventor
Daniel Jordan
By C. A. Snow & Co.
Attorneys Patented Jan. 27, 1925.

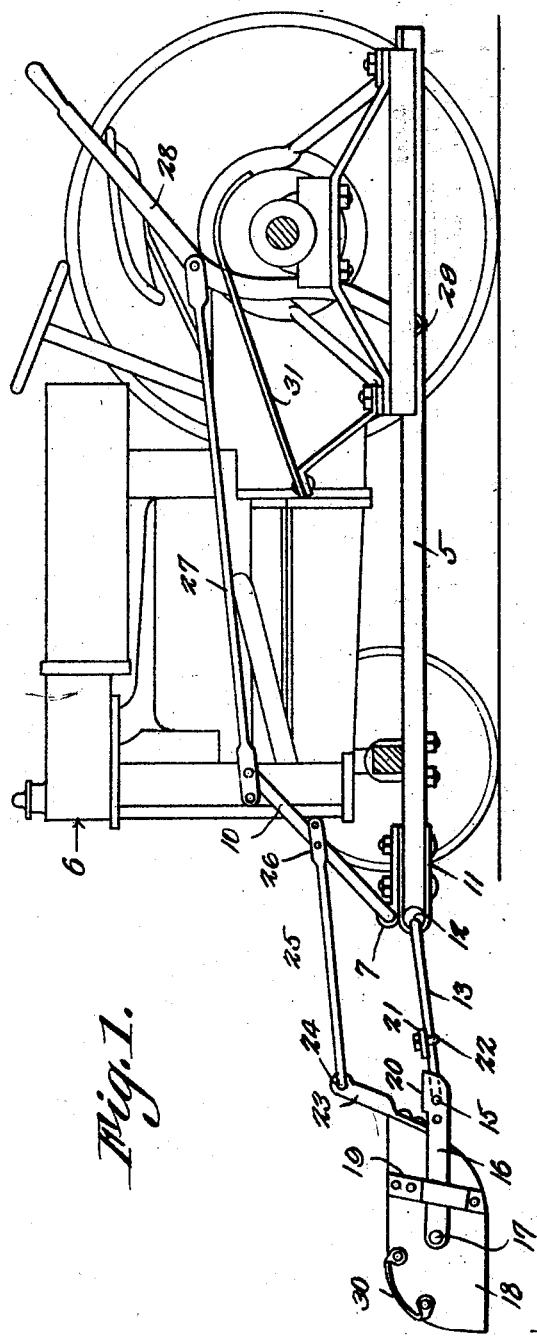

1,524,135

UNITED STATES PATENT OFFICE.

DANIEL JORDAN, OF HARRISON, NEBRASKA.

SCRAPER.

Application filed May 10, 1924. Serial No. 712,330.

*To all whom it may concern:*

Be it known that I, DANIEL JORDAN, a citizen of the United States, residing at Harrison, in the county of Sioux and State of Nebraska, have invented a new and useful Scraper, of which the following is a specification.

The present invention has reference to a road scraper and aims to provide novel means for attaching a scraper to a tractor or the like whereby the scraper may be conveniently manipulated from the seat of the operator to facilitate the use of the scraper.

Another important object of the invention is to provide a device of this character wherein the scoop or scraper may be readily moved to its inactive or active position, or vice versa.

Another object of the invention is to provide a scoop that may be readily dumped when filled, the dumping being accomplished by the forward movement of the tractor to which the scoop is applied.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a tractor disclosing a scoop and operating mechanism constructed in accordance with the invention as supported thereon.

Figure 2 is a diagrammatical view disclosing the scoop and operating means in various positions, dotted lines being used to indicate the scoop in a dumping and semi-dumping position.

Figure 3 is a plan view of the scoop and operating mechanism.

Figure 4 is a diagrammatical view, the scoop being shown in dotted lines as in its inactive position.

Referring to the drawings in detail, the reference character 5 designates the side rails of the frame of a tractor to which the supporting axles are secured. As shown, the side rails 5 extend beyond the forward end of the tractor proper which is indicated at 6, where they provide supports for the bracket members 7 through which the shaft 8 extends which shaft is provided with upwardly extended right angled end portions 9 and 10 respectively, the right angled portion 10 being relatively long as compared with the right angled portion 9 to increase the leverage thereof.

Embracing the forward ends of the side rails 5 are straps 11 which provides supports for the shaft 12 which is provided with outwardly extended portions 13 that terminate in forwardly extended portions 14. Right angled ends 15 of the portions 14 extend through openings in the bars 16 that have pivotal connection at 17 with the side walls 18 of the scoop so that by moving the bars, a relative movement is imparted to the scoop.

Guarding plates 19 are secured to the side walls of the scoop and are formed with offset portions to accommodate the bars 16, the offset portions being relatively long to allow of movement between the scoop and bars 16. Flanges 20 are provided on the bars 16 and overlie the forwardly extended portions 14 of the shaft 12 providing a rest to transfer the weight of the scoop and material carried therein, to the shaft 12 and at the same time prevent the scoop from swinging downwardly at this point.

In order that the forwardly extended portions 14 will be held in proper spaced relation with each other, a bracing bar 21 is provided and has its ends secured to the forwardly extended portions 14 by means of the U-bolts 22 which are shown as embracing portions of the forwardly extended portions 14.

Secured to the rear wall of the scoop are curved arms 23 that have openings designed to receive the right angled portion 24 of the connecting rods 25 which are formed with relatively wide portions 26 which openings are provided to accommodate a suitable bolt or rod for connecting the connecting rods to the end portions 9 and 10 of the shaft 8.

Connected with the upper end of the end portion 10 is an operating rod 27 that extends rearwardly and is provided with a right angled portion adapted to extend through an opening disposed substantially intermediate the ends of the operating lever 28 which lever has pivotal connection with the frame of the tractor at 29.

It will be seen that the upper end of the operating lever is disposed adjacent to the operator's seat whereby the lever may be conveniently manipulated by a person controlling the tractor making it unnecessary for more than one person to operate the tractor and scoop.

The lever 28 operates in a slotted keeper 31 which is provided with a shoulder behind which the lever may move to lock the lever against movement.

Shoes 30 are provided on the forward upper edges of the scoop providing supports for the scoop when the scoop is being moved over the ground surface in a dumping position.

As clearly shown by Figure 1 of the drawings, the scoop is in its active position or in a position to scrape and remove a portion of a road surface. When it is desired to remove the scoop to its inactive position, the lever 28 is moved from its position within its keeper 31, whereupon the forward movement of the tractor will cause the scoop to dig into the surface with the result that the scoop will fold towards the tractor. With the scoop in this position, the operating lever is again returned to locked position within the keeper 31 and the scoop is held against forward movement.

Upon releasing the lever 28 the scoop will fall down from its idle position as shown in dotted lines in Figure 4 of the drawings to a position as shown in full lines in Figures 1 and 4 of the drawings.

I claim:—

In a device of the character described, a frame including side rails, a scoop having guarding plates formed on its ends, bars having pivotal connection with the scoop and positioned within the guards, a rod supported by the side rails, said rod having forwardly extended portions terminating in right angled ends, said right angled ends adapted to extend through openings in the bars to pivotally connect the scoop and side rails, curved arms secured to the scoop, an operating rod, means for connecting the operating rod and the curved arms, and means for moving the operating rod to cause the scoop to swing to its active or inactive position.

In testimony that I claim the foregoing as my own, I have hereto affixed my signature in the presence of two witnesses.

DANIEL JORDAN.

Witnesses:
J. H. WILHERMSDORF, Jr.,
A. L. SCHNURE.